United States Patent [19]
Landes et al.

[11] Patent Number: 5,570,857
[45] Date of Patent: Nov. 5, 1996

[54] HINGED AIRCRAFT SKI FOR IMPROVING EGRESS AND INGRESS FROM AN AIRCRAFT CABIN

[76] Inventors: Wesley K. Landes, 3500 O'Malley Rd.; Gary I. Landes, 3400 O'Malley Rd., both of Anchorage, Ak. 99516

[21] Appl. No.: 305,767

[22] Filed: Sep. 13, 1994

[51] Int. Cl.⁶ ............................. B64C 35/00; B64C 25/52
[52] U.S. Cl. .......................... 244/108; 244/101; 244/105
[58] Field of Search ..................................... 244/101, 105, 244/106, 107, 108

[56] References Cited

U.S. PATENT DOCUMENTS

| | | |
|---|---|---|
| 1,876,158 | 9/1932 | Winter ........................................ 244/101 |
| 2,548,832 | 4/1951 | Tydon ........................................ 244/101 |
| 2,574,404 | 11/1951 | Levy ........................................... 244/108 |
| 2,673,698 | 3/1954 | Eriksson .................................... 244/105 |
| 2,686,023 | 8/1954 | Larry . | 
| 3,128,065 | 4/1964 | Landes . |
| 4,026,502 | 5/1977 | Masclet .................................... 244/105 |

FOREIGN PATENT DOCUMENTS 018476  8/1914  United Kingdom ................... 244/105

OTHER PUBLICATIONS

Eberhard Rotary Latch 1–400 R&L, manufactured by Everhard Manufacturing Co. of Cleveland, Ohio (undated).

Primary Examiner—Andres Kashnikow
Assistant Examiner—Virna Lissi Mojica
Attorney, Agent, or Firm—Graybeal Jackson Haley & Johnson

[57] ABSTRACT

A flotation apparatus, specifically a ski (27), is provided for use on an aircraft (21) for improving the egress and ingress from the aircraft cabin (20). The ski (27) is particularly applicable to helicopters (21) having fixed wheeled landing gear (23) wherein the helicopter (21) engages in rope repelling missions or wherein egress and ingress from the helicopter cabin (20) may be performed during low hover operations. The ski (27) includes a forward potion (55) substantially fixed in a parallel configuration with respect to the longitudinal axis of the helicopter and an aft portion (57). The aft portion (57) is rotatable from a substantially parallel configuration with respect to the longitudinal axis of the helicopter to a substantially perpendicular configuration with respect to the longitudinal axis of the helicopter; the aft portion (57) is rotatably attached to the forward portion (55) using a fastener, specifically a hinge means (35). During use, an operator uses a grapple hook (77) to release at least one latching mechanism (65) wherein the aft portion (57), under the force of gravity and from the downwash of the rotorblades, rotates into the substantially perpendicular relationship with respect to the longitudinal axis of the helicopter, in this configuration egress and ingress from the helicopter cabin is not impeded. To reconfigure the aft portion (57) into a flight or landing configuration, the operator grasp the aft portion (57) with the grapple hook (77) thereby pulling upward on the aft portion (57) until the aft portion (57) is securely latched to the forward portion (55).

15 Claims, 6 Drawing Sheets

HINGED AIRCRAFT SKI FOR IMPROVING EGRESS AND INGRESS FROM AN AIRCRAFT CABIN

FIELD OF THE INVENTION

The present invention generally relates to aircraft skis, and more specifically relates to skis configured for use on rotor wing aircraft (helicopters), wherein at least one ski includes an aft portion of the ski rotatably attached to a forward portion of the ski, the aft portion being rotatable from a substantially parallel configuration with respect to a longitudinal axis of the aircraft to a substantial perpendicular relationship with respect to the longitudinal axis of the aircraft, for improving in-flight egress and ingress from the helicopter cabin.

BACKGROUND OF THE INVENTION

The versatility of an aircraft can be enhanced by various aircraft accessories applicable to a specific aircraft, and by making improvements and/or modifications to the aircraft to support different flight configurations. One such accessory or modification, which is the topic of the present invention, is adapting flotation devices, or more preferably skis, to the landing gear of aircraft.

Skis provide for the safe landing of an aircraft on soft surfaces such as snow (or ice) covered surfaces, soft sand, march, muskeg, tundra, etc. Thus, the ski improves the versatility of the aircraft by providing landing gear adaptable to multiple landing surfaces. This in turn improves the utility of the aircraft both by reducing the number of aircraft required to perform different missions and by adding versatility to a single aircraft during a single flight, i.e., the pilot has greater discretion when choosing an appropriate landing site.

A landing gear that becomes bogged down during a running landing or take-off can damage the landing gear, or in a worse case scenario, cause a serious accident or injury. A ski adapted to an aircraft, both fixed wing aircraft and helicopters, prevents the landing gear from penetrating the landing surface. U.S. Pat. No. 3,128,065 issued to Landes illustrates one such ski specifically designed to work in conjunction with a conventional fixed wheeled landing gear of a helicopter. The Landes patent modifies the existing landing gear by adapting a ski to the landing gear without requiring the removal of (or otherwise inhibiting the use of) the wheel portion of the wheeled landing gear. In this regard, the Landes patent provides a landing gear modification that facilitates landing the helicopter on both non-skid hard surfaces (i.e., the wheel portion of the landing gear contacts the surface prior to the generally planar lateral surface of the ski contacting the surface) and on soft surfaces (i.e., the wheel portion of the wheeled landing gear penetrates the soft surface until the weight of the helicopter is equally distributed along the generally longitudinal lateral length of the ski).

U.S. Pat. No. 2,686,023 issued to Larry illustrates an alternative aircraft ski more applicable to fixed wing aircraft. The ski of the Larry patent replaces the wheel portion of the wheeled landing gear such that the aircraft can be landed on soft surfaces and/or snow (or ice) covered hard surfaces. In this regard, while the ski of the Larry patent facilitates landing an aircraft on both non-skid hard surfaces—when the wheel portion is in place—and on soft surfaces, specifically snow covered surfaces—when the ski is in place—, because the wheel portion of the landing gear must be removed to accommodate the ski and vice versa, the aircraft cannot be landed on both non-skid hard surfaces (e.g., grass and/or pavement) and soft surfaces, during a single mission; this reduces the pilots discretionary landing options on any one flight.

Since helicopters can land and take off vertically, a ski, with or without a wheel portion, generally will not significantly interfere with the landing of the helicopter on various surfaces during a single mission, the ski merely provides sufficient surface area to support the weight of the helicopter on soft surfaces (this is not to exclude the benefits of running landings and takeoffs regarding transitional lift). However, in order to provide sufficient surface area to support the helicopter, the ski, having a significant length dimension, generally extends longitudinally rearward of the conventional landing gear into the area normally used for safe egress and ingress from the helicopter cabin. In this regard, the ski can become a safety hazard for certain egress and ingress activities such as rope repelling from the helicopter cabin during in-flight missions, or jumping from the helicopter cabin during low hover exercises. In a worst case scenario, a rope or cable may become entangled in the ski during repelling activities, thereby interfering with the safe operation of the mission, damaging the aircraft and/or injuring the persons performing the exercise. In addition, should an individual inadvertently land on the ski when jumping from the helicopter cabin, the individual could be injured or alternatively cause the aircraft to tip, with the pilot losing control of the aircraft. In any event, serious injury could occur and/or significant damage be caused to the aircraft or the landing gear (i.e., the ski) such that the aircraft cannot be landed safely.

Accordingly, there is a need for an aircraft ski, specifically a helicopter ski, that does not impede egress and ingress from the aircraft cabin, particularly with respect to rope egress and ingress from the helicopter cabin, jumping from the helicopter cabin, or use of a helicopter hoist to raise and lower cargo from the helicopter cabin.

SUMMARY OF THE INVENTION

The present invention provides a ski adapted for use on a helicopter wherein the aft portion of the ski, specifically the portion of the ski just aft of the wheeled landing gear, is capable of being rotated into a substantially perpendicular configuration with respect to the longitudinal axis of the helicopter to improve egress and ingress from the helicopter cabin.

In the preferred embodiment of the present invention, the ski has a conventional geometric shape with a slightly upward curving tip. On either side of the ski running the longitudinal length of the ski are two reinforcement/mounting ribs for providing strength and rigidity to support the weight of the helicopter, to evenly distribute the weight of the helicopter along the generally lateral planar surface of the ski and for mounting the ski to the helicopter landing gear. The two ribs form a longitudinally center channel within the ski wherein the wheel portion of the wheeled landing gear can be pulled into position along the center channel. At approximately the midway point along the ski there is provided an aperture for receiving therethrough the wheel portion of the wheeled landing gear. The ribs, in addition to adding rigidity and strength to the overall ski, provide a mounting surface for attaching thereto necessary hardware including pins and latches for rotatably affixing the aft portion of the ski to the forward portion of the ski. In this regard, the aft portion of the ski can be rotated from a substantially parallel configuration with respect to the longitudinal axis of the helicopter to a substantially perpendicular configuration with respect to the longitudinal axis of the helicopter. Preferably, there are provided at least two hinges mounted on the underside of the generally lateral planar surface of the ski for rotating the aft portion of the ski about a common pivot axis.

On the rearwardmost part of the forward portion of the ski, and mounted on the inner surface of the support ribs, are provided two latching mechanisms each cooperating with a latch pin mounted on the forwardmost part of the aft portion of the ski. The latching mechanisms securely hold the aft portion of the ski in place for takeoff, landing and forward flight maneuvers, and can be released when it is desirable to rotate the aft portion of the ski to a substantially perpendicular configuration with respect to the longitudinal axis of the helicopter to improve egress and ingress from the helicopter cabin. To rotate the aft portion, an operator simultaneously releases the latching mechanisms thereby allowing the latch pins to exit the latching mechanisms, hence the aft portion of the ski rotates downward under the force of gravity to a substantially perpendicular configuration with respect to the longitudinal axis of the helicopter thereby improving in-flight egress and ingress from the helicopter cabin.

The latching mechanisms of the present invention are connected by an interconnector cable, the connector cable being attached between two release plates—one release plate attached to each of the latching mechanisms. During operation, an operator grasps the connector cable with a grapple hook, preferably at a substantial center point of the connector cable, pulls upward on the cable thereby simultaneously rotating the release plates; this releases both latching mechanisms. Under the force of gravity, the aft portion of the ski rotates to a substantially perpendicular configuration with respect to the longitudinal axis of the helicopter. In the perpendicular configuration, the aft portion of the ski no longer inhibits ingress and egress from the helicopter cabin.

In the preferred embodiment of the present invention, there is provided a full swivel tail wheel attached to the rearwardmost part of the aft portion of the ski. The tail wheel is a conventional tail wheel and is configured in the present invention to be readily grasped by a grapple hook wherein, when it is desirable to reestablish the geometry of the ski for purposes of forward flight or landing, the operator grasps the aft portion of the ski, specifically the tail wheel mounting spring, with the grapple hook, and lifts the aft portion of the ski upward until the latch pins are securely locked in place within the latching mechanism. During operation, the tail wheel, similar to the main wheeled landing gear, prevents the generally lateral planar surface, specifically the rearwardmost part of the aft portion of the ski, from contacting the non-skid hard surface when the aircraft is landed on a conventional runway. When the aircraft is being landed on a soft surface, the tail wheel penetrates the soft surface until the weight of the helicopter is evenly distributed along the longitudinal length of the ski.

The latching mechanisms of the present invention includes three spring biased rotating plates and a rotating catch plate perpendicular to the spring biased rotating plates. Two of the three spring biased rotating plates are configured to accept and retain a substantially round latch pin secured to the aft portion of the ski. The three spring biased rotating plates, when the catch plate is rotated to a release position, eject the latch pin, hence the aft portion of the ski rotates in an arc to a substantially perpendicular configuration with respect to the longitudinal axis of the helicopter. The three spring biased rotating plates and the rotating catch plate are mounted on a slam latch mounting plate, the mounting plate being adjustable on the respective ridge of the ski.

BRIEF DESCRIPTION OF THE DRAWINGS

The advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

For purposes of describing a preferred ski 27 of the present invention, the ski 27 will be limited to an aircraft, specifically a helicopter 21, having wheeled landing gear 23 wherein a wheel portion 24 of the wheeled landing gear 23 penetrates through an aperture 30 of the ski 27. More specifically, the helicopter used to describe the ski 27 of the present invention will be an Airforce HH-60G PAVE HAWK as well as the U.S. Army UH-60A BLACKHAWK helicopter. However, it will be readily apparent to those skilled in the art, that the ski 27 of the present invention is equally applicable to all types of helicopters and helicopter landing gear; that the ski 27 can be positioned on either the right side or the left side of the helicopter; and, depending on various missions and flight configurations, the ski of the present invention is equally applicable to fixed wing aircraft where a conventional non-hinging ski could interfere with in-flight egress.

Further, while the preferred embodiment of the present invention is being described for use on a helicopter wherein the wheel portion 24 of the wheeled landing gear 23 remains in place (i.e., the helicopter can be landed on non-skid hard surface runways wherein the wheel portion 24 of the wheeled landing gear 23 contacts the surface prior to the ski contacting the surface and on soft surfaces wherein the wheel portion 24 of the wheeled landing gear 23 penetrates the soft surface until the weight of the helicopter is equally distributed along the longitudinal length of the ski), it will be readily apparent to those skilled in the art that the ski 27 of the present invention may be used on helicopters (and fixed wing aircraft) wherein the ski 27 of the present invention replaces the wheel portion. In addition, because it is presumed that the ski 27 of the present invention may slightly increase the payload of the helicopter 21, the present invention will be described as being applicable to only one landing gear 23—either the left landing gear or the right landing gear (preferably the right side) with a conventional ski on the opposite landing gear. It will also be readily apparent to those skilled in the art that, on certain types of missions using certain types of aircraft, egress and ingress may be desired from both sides of the aircraft. In this regard, the ski 27 of the present invention may be installed on both landing gear. Finally, for purposes of describing the ski 27 of the present invention, reference will be made to the longitudinal axis of the helicopter. In this regard, the longitudinal axis of the helicopter will be defined as that axis running longitudinally from the end of the tail boom to the forward nose of the helicopter substantially centrally through the helicopter cabin.

Figure 1:
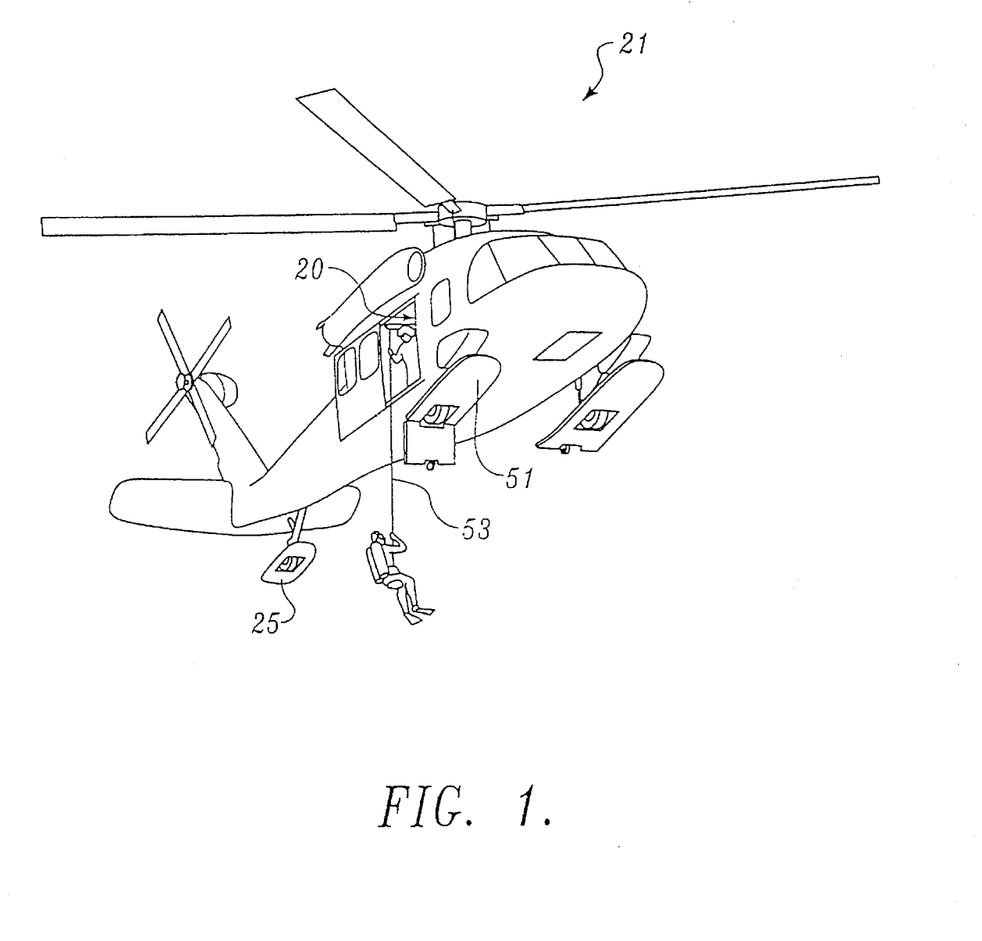
FIG. 1 is a right front perspective view of a helicopter having a ski according to the present invention mounted on the right forward landing gear of the helicopter.

Referring to FIG. 1, there is shown a helicopter 21 utilizing a ski 27 of the present invention. More specifically, the ski 27 of the present invention is shown mounted on the right side of the helicopter 21 wherein in-flight egress and ingress is being performed from the right side of the helicopter cabin by way of an individual suspended from a cable 53; presumably the helicopter would be in a hover or otherwise slow forward or rearward slow hover configuration. As can be seen in FIG. 1, an aft portion 57 of the ski 27 is rotated to a substantially perpendicular configuration with respect to the longitudinal axis of the helicopter. Because the aft portion 57 is rotated downward and forward, the ski 27 does not interfere with in-flight egress and ingress from the helicopter cabin.

Figure 2:
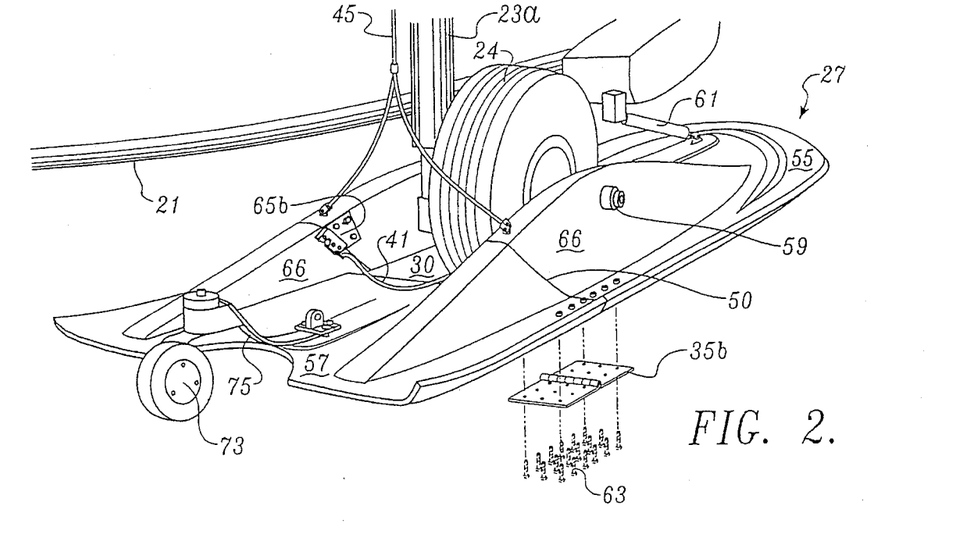
FIG. 2 is a right rear partially exploded perspective view of the ski of the present invention illustrating the ski attached to the right forward landing gear of the helicopter, the ski being in landing or forward flight configuration.

Referring now to FIG. 2, there is shown the ski 27 of the present invention in a conventional flight configuration. The ski 27 includes a forward portion 55 and an aft portion 57. The forward portion 55 and the aft portion 57 are preferably separated just behind the wheel portion 24 of the wheeled landing gear 23 at a seam 50. In this regard, the aft portion 57 is attached to the forward portion 55 preferably with two rotatable fasteners, specifically hinges 35a and 35b, mounted on either side of the ski 27. The hinges 35a and 35b, in the preferred embodiment of the present invention, are conventional folding hinges and are secured to the underside, specifically the lateral planar surface, of the ski 27 using fastener 63. The fasteners 63 may be, for example, screws or rivets.

The aft portion 27 of the ski is rotatably fastened to the forward portion 55 of the ski 27 such that the aft portion can rotate from a substantially horizontal configuration wherein the longitudinal axis of the ski 27 substantially parallels the longitudinal axis of the helicopter 21, to a substantially perpendicular configuration with respect to the longitudinal axis of the helicopter 21. It will be readily apparent to those skilled in the art that any form of rotating means may be used wherein the aft portion 57 can be rotated (or otherwise repositioned) to a substantially perpendicular configuration with respect to longitudinal axis of the helicopter. In addition, it will be readily apparent that the hinges 35a and 35b may be any type of hinge including a living hinge, and may be fastened to the ski 27 using any type of fastening means. Further, it will be considered within the purview of the present invention to have any type of ski that is mounted on an aircraft wherein a portion of the ski, specifically the aft portion of the ski, can be repositioned by rotating the aft portion, or be repositioned by any other suitable means wherein the aft portion of the ski, which would otherwise interfere with safe egress and ingress from the aircraft cabin, is relocated with respect to the helicopter cabin or the forward portion of the ski.

In the preferred embodiment of the present invention, the ski 27 of the present invention is mounted to the main landing gear 23 of the helicopter 21 using a conventional axle pin mount 59. In this regard, the ski 27 may include a check cable 45 (as described in greater detail in U.S. Pat. No. 3,128,065) and a conventional dampening mechanism 61. The ski 27, when in a conventional in-flight configuration wherein the aft portion 57 is in a substantially parallel configuration with respect to the longitudinal axis of the helicopter, very much resembles a conventional ski used on both fixed wing aircraft and rotor wing aircraft.

In the preferred embodiment of the present invention, the ski 27 has a generally lateral planar runner portion for contacting a landing surface (not shown) and ridges 66 extending longitudinally along the length of the ski on both sides. The ridges 66 provide strength and rigidity to the lateral planar runner portion; provide a mounting surface for latching mechanisms 65a and 65b; and provide a mounting surface for securing the ski 27 to the main wheeled landing gear 23. In addition, the ridges 66 form an inner channel 67 wherein the wheel portion 24 of the wheeled landing gear 23 may be rolled into place and secured within a substantial center of the ski 27. While the ski 27 of the preferred embodiment includes two ridges 66, it will be readily apparent for those skilled in the art that any number of ridges 66 may be used, or alternatively, the ridges 66 may be replaced with braces.

On either side of the inner channel 67 are provided latching mechanism 65a and 65b. As will be described in greater detail below, the latching mechanisms include a latch pin 69 attached to the aft portion 57 of the ski 27, and a latching mechanisms 65 attached to the forward portion 55 of the ski 27. The latch pin can be latched in place within the latching mechanisms 71 for forward flight and landing or released from the latching mechanism for in-flight egress and ingress from the helicopter cable. In addition, there is provided a full swivel wheel 53 spring mounted to the aft portion 57 of the ski 27 on a spring member 75.

The hinged ski 27 is preferably constructed of a fiberglass-reinforced isophthalic polyester, and finished with an isophthalic polyester gel coat. The bottom finish of the ski 27 is preferably a graphite-impregnated epoxy resin coated with Teflon Urethane. The surface coating of the ski 27 is preferably durable and unaffected by gas, oil and environmental conditions, including extremely cold temperatures. The ski 27 of the present invention is preferably interchangeable with either the right or left wheeled landing gear 23a and 23b, and may be installed on both wheeled landing gear 23a and 23b simultaneously if so desired.

Figure 3:
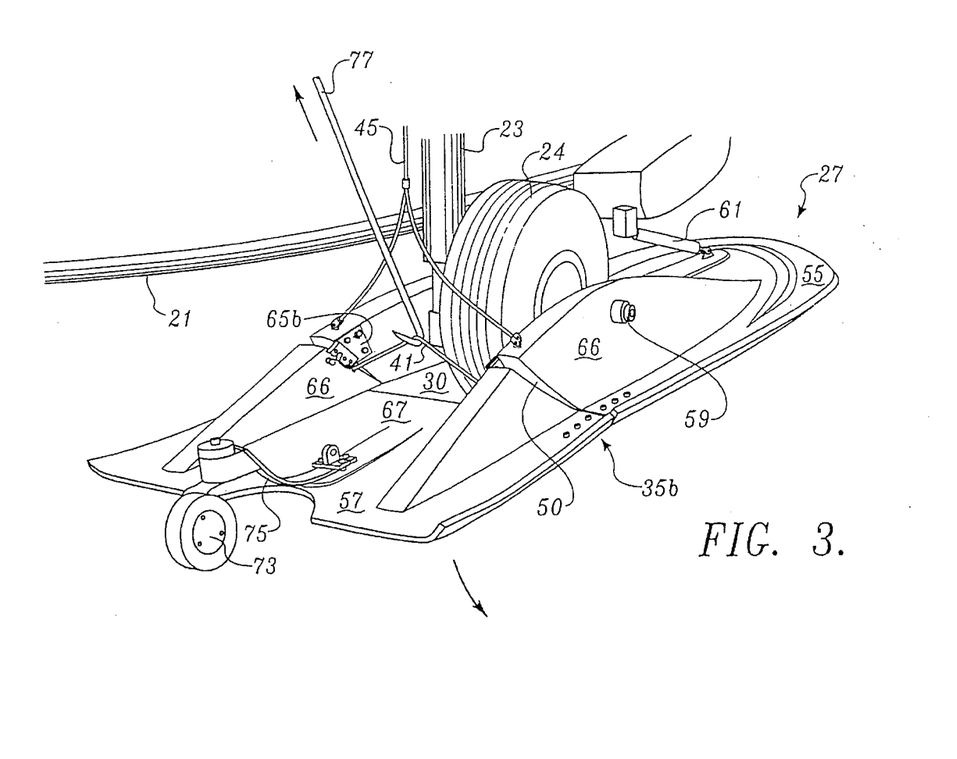
FIG. 3 is a right rear perspective view of the ski of the present invention illustrating an operator using a grapple hook to pull upward on a release cable to rotate the catch plates to release the aft portion of the ski.

Referring now to FIG. 3, there is shown the ski 27 in a partially released configuration. More specifically, an operator wishing to improve the in-flight egress and ingress from the helicopter cabin by rotating the aft portion 57 to a substantially perpendicular configuration with respect to the longitudinal axis of the helicopter, reaches down with a grapple hook 77 and grasps the release cable 41. The user then pulls upward on the release cable 41, the ends of release cable 41 thereby retracting toward the center of the channel 67 and rotating the latch release plates 107 (described in greater detail below). The latch release plates 107 release the latching mechanisms 65a and 65b; this allows the aft portion 57 to freely rotate about the hinges 35a and 35b.

Once the latching mechanisms 65a and 65b have been released, the aft portion 57, by way of gravitational forces, is pulled in downward arc to a substantially perpendicular configuration with respect to the longitudinal axis of the helicopter. The actual configuration of the aft portion 57 of the ski 27, with respect to the longitudinal axis of the helicopter, will depend on the movement of the helicopter 21 and the relative wind impinging on the aft portion 57. In other words, if the helicopter 21 is in a substantially stationary hover, the aft portion 57 will maintain a substantially perpendicular configuration with respect to the longitudinal axis of the helicopter 21. If, on the other hand, the helicopter has some forward momentum, the relative wind impinging on the aft portion 57 will prevent the aft portion 57 from rotating to a substantially perpendicular configuration. In the preferred embodiment of the present invention, the weight of the aft portion 57 is sufficient such that a slight forward momentum of the helicopter will not produce sufficient wind force to raise the aft portion 57 to a configuration that would impede the egress and ingress from the helicopter cabin. If the helicopter has a slight rearward momentum, the aft portion 57 may, as a result of the relative wind from the rear of the helicopter, rotate beyond a substantially perpendicular configuration with respect to the longitudinal axis of the helicopter; it may be difficult for the operator to grasp the aft portion 57. In this regard, a check cable may be installed to prevent the aft portion 57 from rotating to a position that would be difficult for an operator to reach with a grapple hook 77.

It will be readily apparent to those skilled in the art that various types of release mechanisms may be used to rotatably release the aft portion 57 of the ski 27, including electronic and/or mechanical releases wherein the pilot of the aircraft may release the aft portion 57 remotely; this would eliminate having an operator in the rear cabin of the helicopter. Alternatively, where weight considerations are less of a factor, hydraulic means may be incorporated into the ski 27 wherein the aft portion 57 may be hydraulically rotated, or otherwise repositioned by an operator. The inventive concept of the present invention relates to the ability to relocate the aft portion 57 of the ski 27 to improve egress and ingress from the helicopter cabin.

Figure 4:
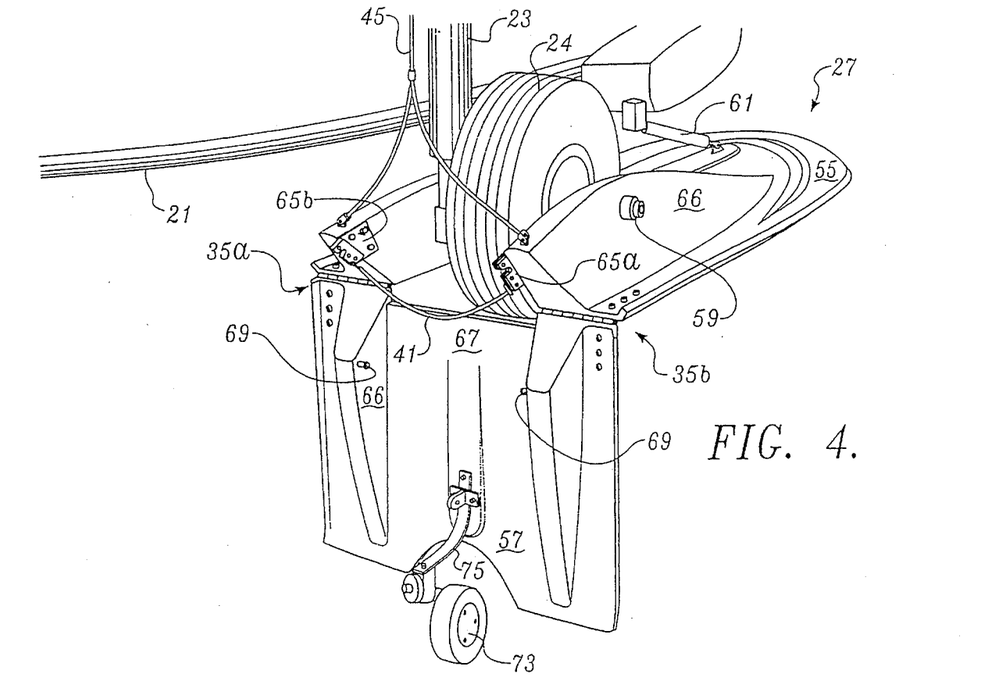
FIG. 4 is a right rear perspective view of the ski of the present invention illustrating the ski in a hinged configuration for facilitating in-flight egress and ingress from the helicopter cabin.

The ski 27 of the present invention is shown in FIG. 4 in a preferred hinged configuration wherein egress and ingress into the helicopter cabin is not inhibited by the ski 27. In a hover configuration, the down draft of the helicopter rotor blades and the gravitational forces working on the aft portion 57 will maintain the aft portion 57 in a substantially perpendicular configuration with respect to the longitudinal axis of the helicopter.

Figure 5:
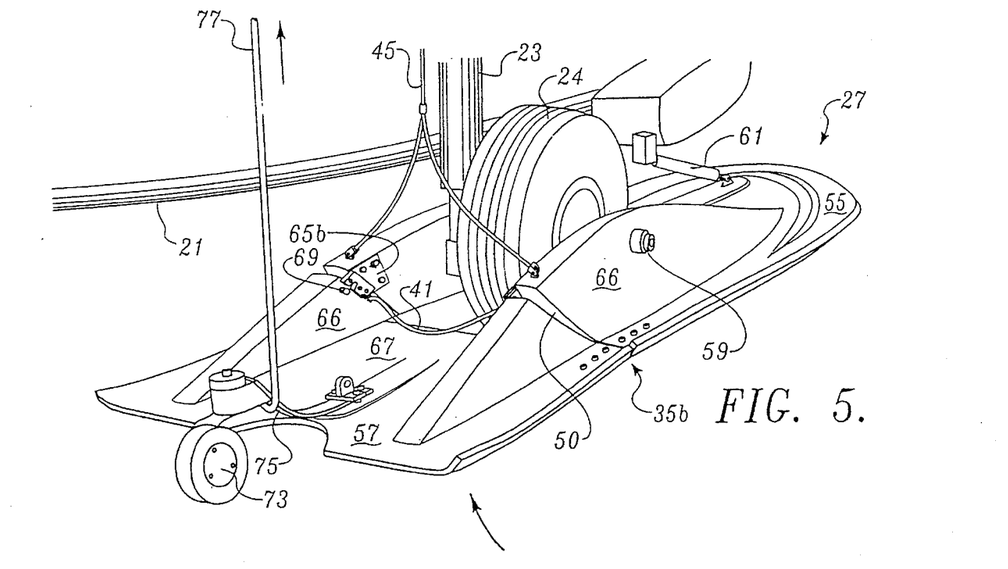
FIG. 5 is a right rear perspective view of the ski of the present invention illustrating the operator using the grapple hook to raise the aft portion of the ski into a landing or forward flight configuration.

FIG. 5 shows the aft portion 57 of the ski 27 being raised into a latched or otherwise forward flight or landing configuration using the grapple hook 77. In this regard, the operator reaches down with the grapple hook, grasps the spring member 75 of the full swivel wheel 73 and pulls the aft portion 57 upward until the latch pins 69 latch within the respective latching mechanisms 65a or 65b; the ski 27 is now in a forward flight or landing configuration. As will be readily apparent to those skilled in the art, or to those familiar with helicopter operations, some forward moment by the helicopter will cause the relative wind contacting the aft portion 57 of the ski 27 to partially rotate the aft portion 57 into parallel configuration, hence less effort is thus required by the operator to lift and latch the aft portion 57 to the forward portion 55. In addition, by using forward momentum to raise the aft portion, the operator would not be required to reach down nearly as far with the grapple hook to grasp the aft portion 57, this makes the latching operation safer.

Figures 6, 7:
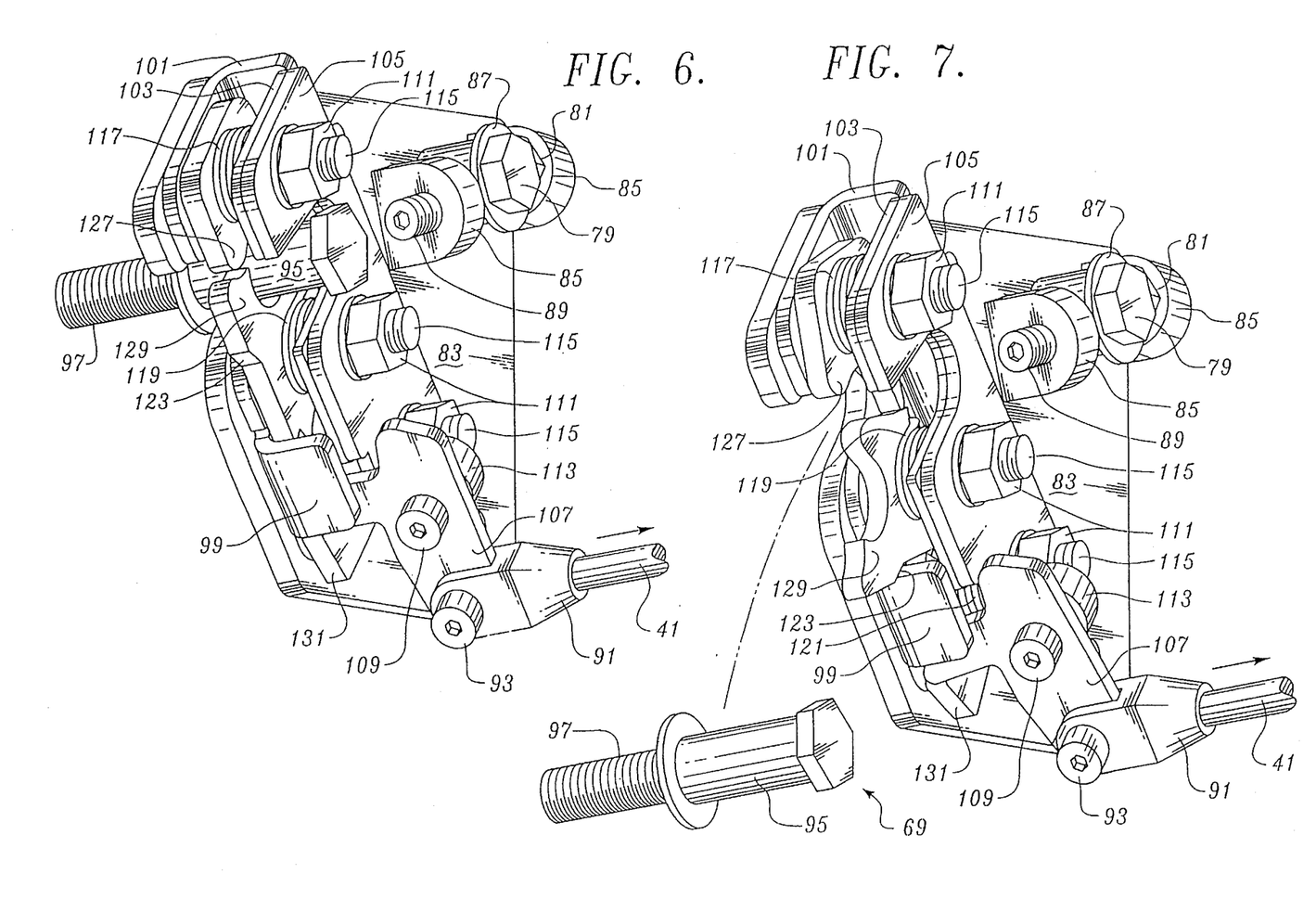
FIG. 6 is a perspective view of the latching mechanism of the ski of the present invention illustrating the latch pin secured within the latching mechanism.
FIG. 7 is a perspective view of the ski of the present invention illustrating the latch pin exploded away from the latching mechanism.
Figure 8:
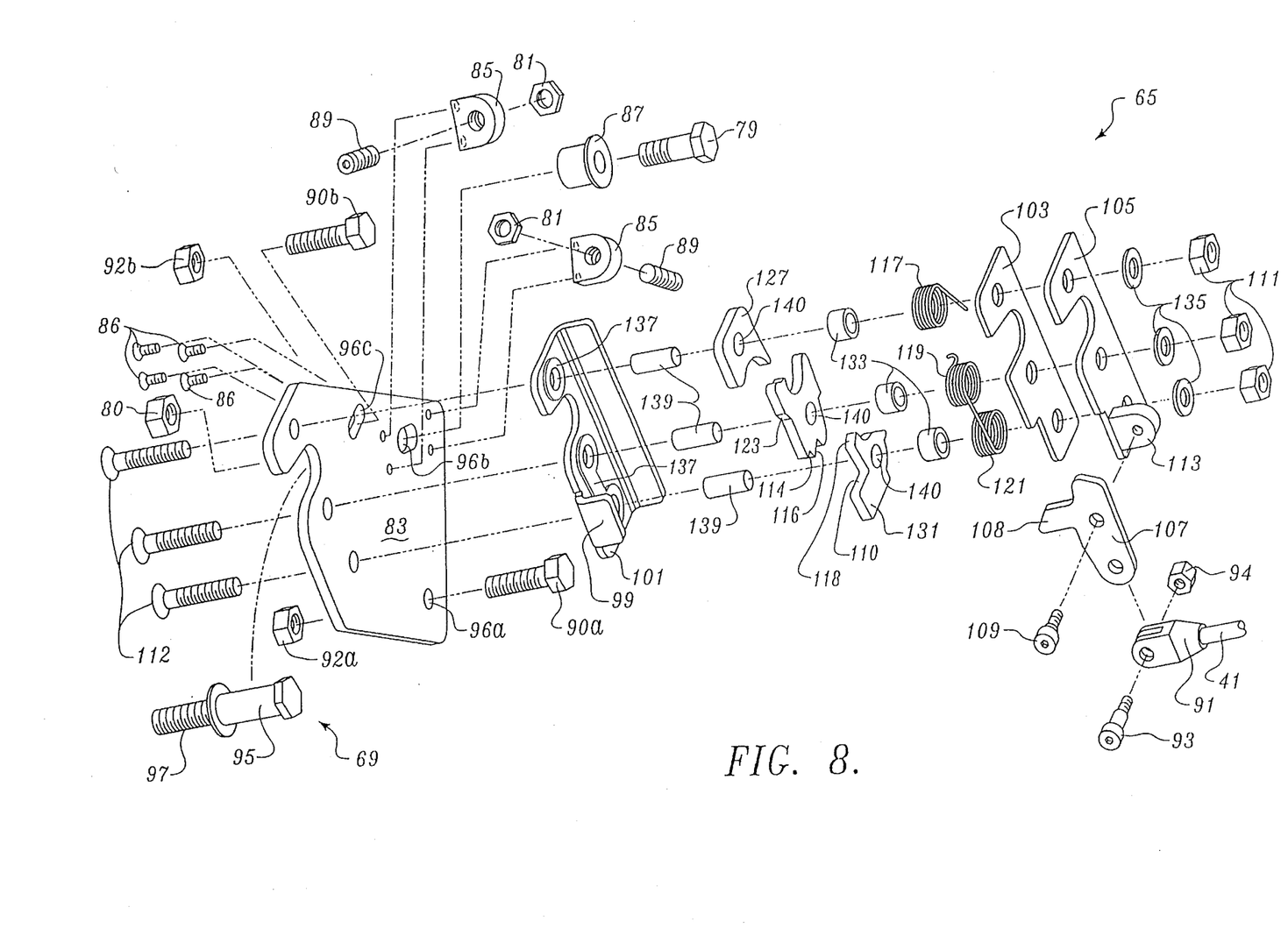
FIG. 8 is an exploded perspective view of the latch mechanism and the latching pin of the ski of the present invention.

Referring now to FIGS. 6, 7 and 8, there is shown one of the latching mechanisms used to secure the aft portion 57 securely to the forward portion 55 in a substantially parallel configuration with respect to the longitudinal axis of the helicopter. FIGS. 6 and 7 show the assembled latching mechanism, FIG. 6 showing the latch pin 69 secured within the latching mechanism 65. FIG. 7 shows the latch pin 69 ejected from the latching mechanism 65 when the release cable 41 is pulled.

Referring to FIG. 8, the latching mechanism 65 is exploded showing the various relationship of the components comprising the latching mechanism. More specifically, the latching mechanism 65 includes a slam latch mounting plate 83 for mounting various hardware components thereto. The slam latch mounting plate 83, being secured to the inner surface of the ridge 66, specifically within the inner channel 67, with three mounting bolts 90a, 90b and 79, and associated nuts 92a, 92b and 80; the slam latch mounting plate 83 serves as the primary mounting platform. For purposes of mounting the latching mechanism 65 to the ridge 66, mounting bolt 90a is inserted through an aperture 96a in the slam latch mounting plate 83, the aperture 96a being slightly oversized with respect to the bolt 90a. Bolts 90b and 79 for securing the slam latch mounting plate 83 to the ridge 66 are inserted through aperture 96b and 96c. Apertures 96b and 96c are oblong apertures allowing the slam latch mounting plate 83 to pivot about the mounting bolt 90a to the extent of the oblong apertures 96b and 96c.

Mounted to the slam latch mounting plate 83 are towers 85 for threaded insertion therethrough of adjustment screws 89; jam nuts 81 are provided to secure the adjustment screws to the towers 85 (the towers 85 are secured in place using fasteners 86). Bolt 79, including a bushing 87, is inserted between the adjustment screws 89, adjustment screws 89 each contacting a substantially opposite side of the bushing 87. With the bolts 90a, 90b and 79 in place but loosened, the adjustment screws 89 can be adjusted against the bushing 87 to pivot the slam latch mounting plate 83 about the bolt 90a; accordingly, the latching mechanisms 65a or 65b can be fine tuned such that the latch pin 69 is received within the latching mechanisms 65a and 65b.

The latching mechanisms 65a and 65b further include a bracket plate 101 having positioned thereon thrust spacers 137. Three rotating plates, specifically a forward rotating latch plate 127, a rear rotating plate 129 and a rotating catch plate 131 are positioned to rest on the thrust spacers 137 and rotate about the thrust spacers 137. Spacer tubes 139 are inserted through apertures 140 in the respective plates and through the backing plate 101. In this regard, the plates 127, 129 and 131 can rotate freely on the backing plate thrust spacers 137. Bushings 133 are inserted over the spacer tubes 139, the bushings 133 having an outside dimension for insertion thereover of spring 117, 119 and 121. The springs 117, 119 and 121 are configured to bias the plates, specifically the forward rotating latch plate 127, the rear rotating latch plate 129 and the rotating catch plate 131, to eject the latch pin 69. More specifically, as viewed from the top of the slam latch mounting plate 83, the forward rotating latch plate 127 is biased in a clockwise rotating configuration, the rear rotating latch plate 129 is biased in a counter clockwise rotating configuration, and the rotating catch plate 131 is biased in a clockwise rotating configuration. In this regard, as the rotating catch plate 131 is rotated in a counterclockwise configuration against the biasing spring 121, the catch plate 131 releases the rear rotating latch plate 129, the rear rotating latch plate 129 and the forward rotating latch plate 127 rotate in unison to eject the latch pin 69. It will be readily apparent to those skilled in the art that the latching mechanism 65 shown in FIGS. 6, 7 and 8 would be installed on the left hand ridge 66 with the ski 27 facing forward, and that the latching mechanism to be installed on the right hand ridge 66 (not shown), would be the mirror image of the latching mechanism 65 shown in FIGS 6, 7 and 8.

Positioned over the plates 127, 129 and 131 and the biasing springs 117, 119 and 121 is a thrust plate 103. Positioned over the thrust plate 103 is a latch release plate 105. The thrust plate 103 and the latch release plate 105 sandwich the rotating plates 127, 129 and 131 and the biasing springs 117, 119 and 121 between the plates 103 and 105 and the backing plate 101. Bolts 112 are then inserted through the slam latch mounting plate 83, the backing plate 101, the spacer tubes 139, the thrust plate 103, the latch release plate 105, and the washers 135, and are securely fastened in place with nuts 111 to complete the assembly of the latching mechanism.

The latch release plate 105 includes a latch release tower 113 for mounting thereto with a bolt 109 a latch release 107. The bolt 109 is threaded into the latch release tower 113. The latch release plate 107, in the preferred embodiment of the present invention, is perpendicular to the rotating plates 127, 129 and 131. The latch release plate 107 has an arm 108 for contacting the rotating catch plate 131. In this regard, when a force is applied to the release cable 41, preferably using the grapple hook 77, the latch release plate 107 rotates about the bolt 109 thereby causing the arm 108 to push against a surface 110 of the rotating catch plate 131. In this regard, the rotating catch plate 131 rotates in a counterclockwise configuration against the biasing spring 121. As the rotating catch plate 131 rotates, an arm 118 attached to the rotating catch plate similarly rotates. Accordingly, the arm 118 rotates out of contact with the surface 114 and 116, thereby allowing the rear rotating latch plate 129, biased by the spring 119, to rotate counterclockwise thus ejecting the latch pin 69 from the latching mechanism 65.

There is provided a safety catch position wherein the arm 118 contacts the surface 114. Accordingly, as the latch release plate 107 rotates further the arm 118 breaks contact with surface 114 thereby allowing the rear rotating latch plate 129 to rotate to the extent the surface 123 comes in contact with the backer plate stop 99; in this configuration, the latch pin 69 is freely ejected from the latching mechanism 65. When the latch pin 69 is released from the latching mechanism 65, the aft portion 57 of the ski 27 is free to rotate from the substantially parallel configuration with respect to the longitudinal axis of the helicopter (FIG. 2) to a substantially perpendicular configuration with respect to the longitudinal axis of the helicopter (FIG. 4), about the hinges 35a and 35b.

Figure 9:
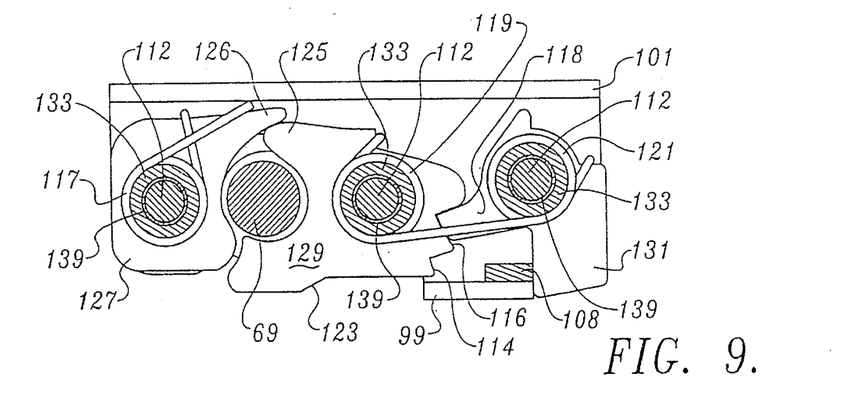
FIG. 9 is an elevational partial cross-sectional view of the latching mechanism of the present invention in a latched configuration.
Figure 10:
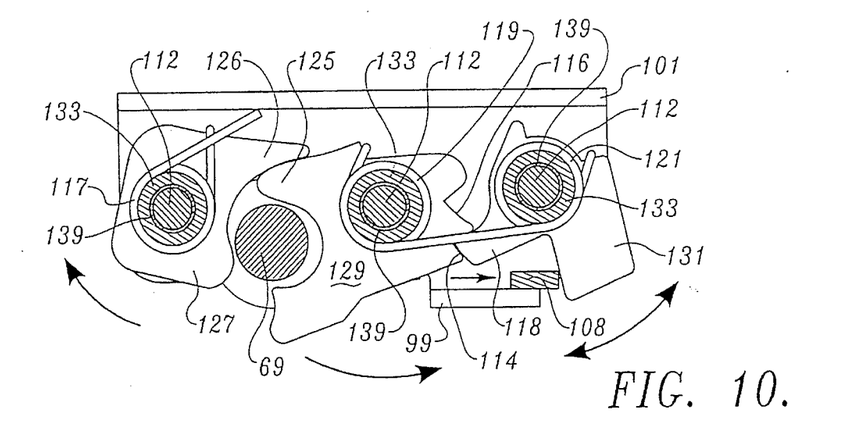
FIG. 10 is an elevational partial cross-sectional view of the latching mechanism of the present invention in safety latch configuration with the latch pin partially ejected from the latching mechanism.
Figure 11:
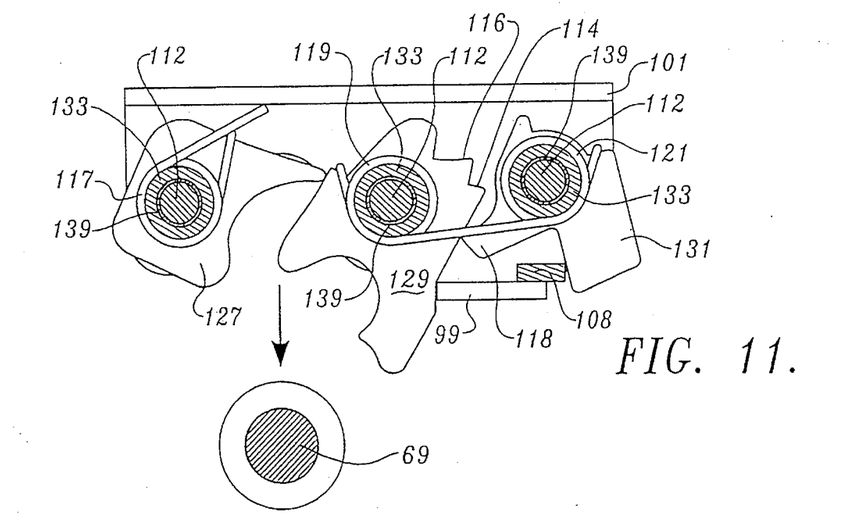
FIG. 11 is an elevational partial cross-section view of the latching mechanism of the present invention in a released configuration with the latch pin ejected from the latching mechanism.

Referring now to FIGS. 9, 10 and 11, there are shown simplified cross-sectional views of the latching mechanism 65 of the present invention going through a release cycle wherein the latch pin 69 is ejected from the latching mechanism 65. It will be readily apparent to those skilled in the art that, in order to securely latch the latch pin 69 into the latching mechanism 65, the reverse of the steps shown in FIGS. 9, 10 and 11 can be performed to reconfigure the aft portion 57 to the substantially horizontal configuration with respect to the longitudinal axis of the helicopter. For purposes of describing the present invention, FIGS. 9, 10 and 11 will be described as they release or otherwise eject the latch pin 69.

Beginning with FIG. 9, the latching mechanism 65 is shown in a latched configuration. This configuration represents the aft portion 57 of the ski 27 being in a substantially horizontal configuration with respect to the longitudinal axis of the helicopter. In this configuration, and as shown in FIG. 9, the latch pin 69 is securely locked between the forward rotating latch plate 127 and the rear rotating latch plate 129. In this configuration, the rotating latch plate 131, specifically the arm 118, is securely locked against the surface 116, thereby preventing the rear rotating latch plate 129 from rotating, i.e., releasing the latch pin 69. A lower an 125 of the rear rotating latch plate 129 remains in contact with a lower arm 126 of the forward rotating latch plate 127. Accordingly, the arm 125 prevents the arm 126 from rotating, thus the forward rotating latch plate 127 and the rear rotating latch plate 129 work in unison to form a collapsible socket which securely holds the latch pin 69.

Referring now to FIG. 10, as the rotating catch plate 131 rotates slightly, the arm 118 of the rotating catch plate 131 slides upward and eventually off the surface 116 onto the surface 114. The relationship between the surface 116 and the surface 114 with respect to the arm 118 is such that the rear rotating latch plate 129 can rotate slightly in a direction that would eject latch pin 69, but not fully to the extent the latch pin 69 is ejected, i.e., this represent a safety catch position, wherein if for any reason debris such as ice becomes jammed within the latching mechanism, not fully allowing the latch pin 69 to be fully inserted into the latching mechanism, the latching mechanism 65 provides for a safety catch wherein the pin 69 will be, for the most part, held securely in place within the latching mechanism.

Referring now to FIG. 11, the arm 108 of the rotating latch release plate 107 has rotated the rotating catch plate 131 such that the arm 118 has risen away from the surface 114. In this regard, the rear rotating latch plate 129 rotates freely until the surface 123 of the rotating latch plate 129 contacts the backer plate stop 99. Accordingly, the latch pin 69 is entirely ejected from the latching mechanism 65.

While the preferred embodiment of the present invention has been illustrated and described, it will be appreciated that various changes can be made therein without departing from the spirit and scope of the invention.

The embodiments of the invention in which an exclusive property right or privilege is claimed are defined as follows:

1. A flotation apparatus for use on an aircraft, the flotation apparatus having a generally lateral flat runner portion for contacting a landing surface, and two raised longitudinal ridge portions for providing rigidity to the runner portion and for providing a rigid mounting surface for securing the flotation apparatus to the aircraft landing gear, comprising:

a. a forward portion being secured to the aircraft landing gear, the forward portion generally being maintained in a parallel configuration with respect to a longitudinal axis of the aircraft;

b. an aft portion rotatably attached to the forward portion, the aft portion being rotatable in an arc from a substantially parallel configuration with respect to the longitudinal axis of the aircraft, to a substantially perpendicular configuration with respect to the longitudinal axis of the aircraft; and c. a fastener connecting the aft portion to the forward portion, the fastener providing for rotation of the aft portion in an arc from a substantially parallel configuration with respect to the longitudinal axis of the aircraft, to a substantial perpendicular relationship with respect to the longitudinal axis of the aircraft, the aft portion, when rotated to the substantial perpendicular relationship, improving egress and ingress from the aircraft cabin.

2. The flotation apparatus of claim 1, wherein a receiving aperture is positioned between the two longitudinally raised ridge portions.

3. The flotation apparatus of claim 1, further comprising:

a. at least one latch pin secured to an inner surface of one of the two longitudinally raised ridge portions;

b. at least one latch means for receiving the at least one latch pin, the at least one latch means secured to an inner surface of one of the two longitudinally raised ridge portions; and c. a release means for releasing the at least one latch means thereby releasing the at least one latch pin.

4. The flotation apparatus of claim 1, further comprising:

a. a plurality of latch pins secured to an inner surface of each of the two longitudinal raised ridge portions;

b. a plurality of latch means for receiving the plurality of latch pins, the plurality of latch means secured to an inner surface of each of the two longitudinal raised ridge portions; and c. an interconnector for connecting the plurality of latch means secured to the inner surfaces of the two longitudinally raised ridge portions wherein the interconnector simultaneously releases the latch means, thereby allowing the aft portion of the flotation apparatus to rotate about the fastener under the force of gravity from the substantially parallel configuration with respect to the longitudinal axis of the aircraft, to the substantially perpendicular configuration with respect to the longitudinal axis of the aircraft.

5. The flotation apparatus of claim 4, still further comprising a spring mounted full swivel wheel secured to a rearmost part of the aft portion of the floatation apparatus, the swivel wheel maintaining the rearmost part of the art portion a distance off the landing surface when the aircraft is landed on a non-skid hard surface.

6. The flotation apparatus of claim 4, wherein the interconnector is a cable having at least two ends, the at least two ends being connected to at least two rotating release catches, the at least two rotating release catches each being secured on a respective latch means, wherein when a substantially upward force is applied to the cable, the at least two ends of the cable retract toward a center of the cable, the retraction of the at least two ends of the cable rotating the at least two rotating release catches thereby simultaneously releasing the at least two latch pins from the at least two latch means.

7. The flotation apparatus of claim 5, wherein the spring mounted full swivel wheel is secured to the rearmost part of said aft portion with a spring member, the spring member being configured to be grasped by a grapple hook to raise the aft portion of the flotation device into a substantially parallel configuration with respect to the longitudinal axis of the aircraft, wherein the latch pins are secured within the latch means.

8. The flotation apparatus of claim 1, wherein fasteners are provided in each of the two raised ridge portions for securing the flotation apparatus to the landing gear of the aircraft.

9. The flotation apparatus of claim 8, wherein the flotation device further comprises a dampening means interconnecting a forward most portion of the flotation apparatus to the landing gear, and a check cable secured to a rearwardmost part of the forward portion, the check cable minimizing the rotation of the flotation apparatus during flight.

10. A flotation apparatus for use on an aircraft, the flotation apparatus having a generally lateral flat runner portion for contacting a landing surface, two raised longitudinal ridge portions for providing rigidity to the runner portion and for providing a rigid mounting surface for securing the flotation apparatus to a aircraft landing gear and a means for securing the flotation apparatus to the landing gear of the aircraft, the flotation apparatus comprising:

a. a forward portion of the flotation device in substantially fixed position with respect to a longitudinal axis of the aircraft; and b. an aft portion, the aft portion which is substantially movable with respect to the longitudinal axis of the aircraft, the aft portion being movable from a landing configuration wherein the lateral flat runner portion of the forward portion and the lateral flat runner portion of the aft portion are substantially co-planar, to an egress and ingress configuration wherein the lateral flat runner portion of the forward portion and the lateral flat runner portion of the aft portion are substantially non-coplanar and wherein said aft portion is in a lower position than its position when its flat runner surface is coplanar with the flat runner portion of said forward portion.

11. The flotation apparatus of claim 10, wherein the aft portion is secured to the forward portion with fastener means, the aft portion being rotatable in an arc from a landing configuration wherein the lateral flat runner portion of the forward portion and the lateral flat runner portion of the aft portion are substantially co-planar, to an egress and ingress configuration wherein the lateral flat runner portion of the forward portion and the lateral flat runner portion of the aft portion are substantially perpendicular to each other.

12. The flotation apparatus of claim 11, wherein the fastener comprises:

a. at least one latch pin secured to an inner surface of one of the two longitudinal ridge portions;

b. at least one latch means for receiving the at least one latch pin, the at least one latch means secured to an inner surface of one of the longitudinal raised ridge portions; and c. an interconnector for connecting the plurality of latch means secured to the inner surfaces of the two longitudinally raised ridge portions wherein the interconnector simultaneously releases the latch means, thereby allowing the aft portion of the flotation apparatus to rotate about the fastener means under the force of gravity from the substantially parallel configuration with respect to the longitudinal axis of the aircraft, to the substantially perpendicular configuration with respect to the longitudinal axis of the aircraft.

13. The flotation apparatus of claim 11, further comprises:

a. a plurality of latch pins each secured to an inner surface of each of the two longitudinal raised ridge portions, a plurality of latch means for receiving a plurality of latch pins, a plurality of latch means secured to an inner surface of each of the two longitudinal raised ridge portion; and c. an interconnector connected between the plurality of latch means secured to the inner surfaces of the two longitudinal raised ridge portions, wherein the interconnector simultaneously releases the plurality of latch means, thereby allowing the aft portion of the flotation apparatus to rotate about the fastener means by the force of gravity from the substantially parallel configuration with respect to the longitudinal axis of the aircraft to a substantially perpendicular configuration with respect to the longitudinal axis of the aircraft.

14. A method for improving egress and ingress from an aircraft cabin, comprising the steps of:

a. releasing a fastener securing aft portion of a flotation apparatus to a forward portion of the flotation apparatus; and b. rotating the aft portion of the flotation apparatus from a substantially parallel configuration with respect to the longitudinal axis of an aircraft, to a substantially perpendicular configuration with respect to the longitudinal axis of the aircraft.

15. The method of claim 14, further comprising the steps of:

a. reaching from the aircraft cabin to the aft portion of the flotation apparatus;

b. grasping an interconnector with a grapple hook; and c. pulling substantially upward on the interconnector wherein the multiple latch means are simultaneously released.

* * * * *